United States Patent
Dhanapal et al.

(10) Patent No.: US 11,903,079 B2
(45) Date of Patent: *Feb. 13, 2024

(54) FRAMEWORK FOR SUPPORTING CUSTOM SIGNALING BETWEEN A WIRELESS DEVICE AND A CELLULAR NETWORK

(71) Applicant: Apple Inc., Cupertino, CA (US)

(72) Inventors: Muthukumaran Dhanapal, Dublin, CA (US); Rajesh Ambati, Los Altos Hills, CA (US); Lakshmi N. Kavuri, Cupertino, CA (US); Thanigaivelu Elangovan, Santa Clara, CA (US); Rafael L. Rivera-Barreto, Santa Clara, CA (US); Madhusudan Chaudhary, Campbell, CA (US); Divyaprakash P. Bhojkumar, Santa Clara, CA (US); Rohan C. Malthankar, San Jose, CA (US); Ajay Singh, Cupertino, CA (US); Sreevalsan Vallath, Dublin, CA (US); Raghuveer Mallikarjunan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/896,819

(22) Filed: Aug. 26, 2022

(65) Prior Publication Data

US 2022/0408510 A1 Dec. 22, 2022

Related U.S. Application Data

(63) Continuation of application No. 17/833,633, filed on Jun. 6, 2022, now Pat. No. 11,470,679, which is a
(Continued)

(51) Int. Cl.
H04W 76/27 (2018.01)
H04W 76/10 (2018.01)
H04W 36/00 (2009.01)

(52) U.S. Cl.
CPC ....... *H04W 76/27* (2018.02); *H04W 36/0069* (2018.08); *H04W 76/10* (2018.02)

(58) Field of Classification Search
CPC ............... H04W 36/305; H04W 76/19; H04W 36/0069; H04W 76/18; H04W 36/0079
See application file for complete search history.

(56) References Cited

U.S. PATENT DOCUMENTS 9,544,709 B2 1/2017 Jain et al.
2009/0262662 A1 10/2009 Ramachandran et al.
(Continued)

FOREIGN PATENT DOCUMENTS

WO 2018137617 1/2018

OTHER PUBLICATIONS

"Physical Cell ID Allocation in Cellular Networks" by Nyberb, dated Jun. 23, 2016 (Year: 2016).

*Primary Examiner* — Nam T Huynh
(74) *Attorney, Agent, or Firm* — Kowert, Hood, Munyon, Rankin & Goetzel, P.C.

(57) ABSTRACT

This disclosure relates to techniques for providing a framework for supporting custom signaling between a wireless device and a cellular network. A wireless device and a cellular base station may establish a wireless link. The wireless device and the cellular base station may perform custom signaling in accordance with the custom signaling framework.

20 Claims, 3 Drawing Sheets

Related U.S. Application Data continuation of application No. 17/533,854, filed on Nov. 23, 2021, now Pat. No. 11,357,073, which is a continuation of application No. 17/241,720, filed on Apr. 27, 2021, now abandoned.

(60) Provisional application No. 63/016,822, filed on Apr. 28, 2020.

(56) References Cited

U.S. PATENT DOCUMENTS

| | | |
|---|---|---|
| 2016/0286410 A1 | 9/2016 | O'Malley |
| 2018/0013568 A1 | 1/2018 | Muhanna |
| 2019/0174571 A1 | 6/2019 | Deenoo et al. |
| 2020/0068630 A1 | 2/2020 | Zhang |
| 2020/0259896 A1 | 8/2020 | Sachs et al. |
| 2021/0153281 A1 | 5/2021 | Deogun et al. |
| 2021/0289534 A1 | 9/2021 | Lei |

FRAMEWORK FOR SUPPORTING CUSTOM SIGNALING BETWEEN A WIRELESS DEVICE AND A CELLULAR NETWORK

PRIORITY INFORMATION

The present application is a continuation of U.S. patent application Ser. No. 17/833,633, entitled "Framework for Supporting Custom Signaling Between a Wireless Device and a Cellular Network", filed Jun. 6, 2022, which is a continuation of U.S. patent application Ser. No. 17/533,854, entitled "Framework for Supporting Custom Signaling Between a Wireless Device and a Cellular Network", filed Nov. 23, 2021, now U.S. Pat. No. 11,357,073, which claims priority to U.S. patent application Ser. No. 17/241,720, entitled "Framework for Supporting Custom Signaling Between a Wireless Device and a Cellular Network", filed Apr. 27, 2021, which claims priority to U.S. Provisional Patent Application No. 63/016,822, entitled "Framework for Supporting Custom Signaling Between a Wireless Device and a Cellular Network," filed Apr. 28, 2020, all of which are hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for providing a framework for supporting custom signaling between a wireless device and a cellular network.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for providing a framework for supporting custom signaling between a wireless device and a cellular network.

According to the techniques described herein, certain types of signaling may be configured for use for custom signaling between wireless devices and cellular networks, for example according to a framework that may allow user devices and network equipment to recognize such signaling as custom signaling.

Such a custom signaling framework can be used to support agreements for implementing and performing signaling relating to custom or proprietary features that can be made between various parties, such as between a wireless device vendor and a cellular network operator, among other possibilities.

For example, a wireless device and a cellular base station could perform custom signaling according to such a custom signaling framework to perform a handshake to confirm mutual support for a custom feature that is implemented by the wireless device and the cellular base station, and/or for performing signaling related to such a feature (e.g., enabling or disabling the feature, providing measurements and/or parameters associated with the feature, etc.).

The custom signaling framework could include the use of certain portions of radio resource control and/or non-access stratum messages for providing the custom signaling. For example, specified values and fields of abstract syntax notation messages could be configured for use for custom signaling, certain spare bits or fields of radio resource control or non-access stratum messages could be configured for use for custom signaling, and/or custom signatures could be configured for use for custom signaling when appended to radio resource control or non-access stratum messages, among various possibilities.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")— any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)— The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 1:
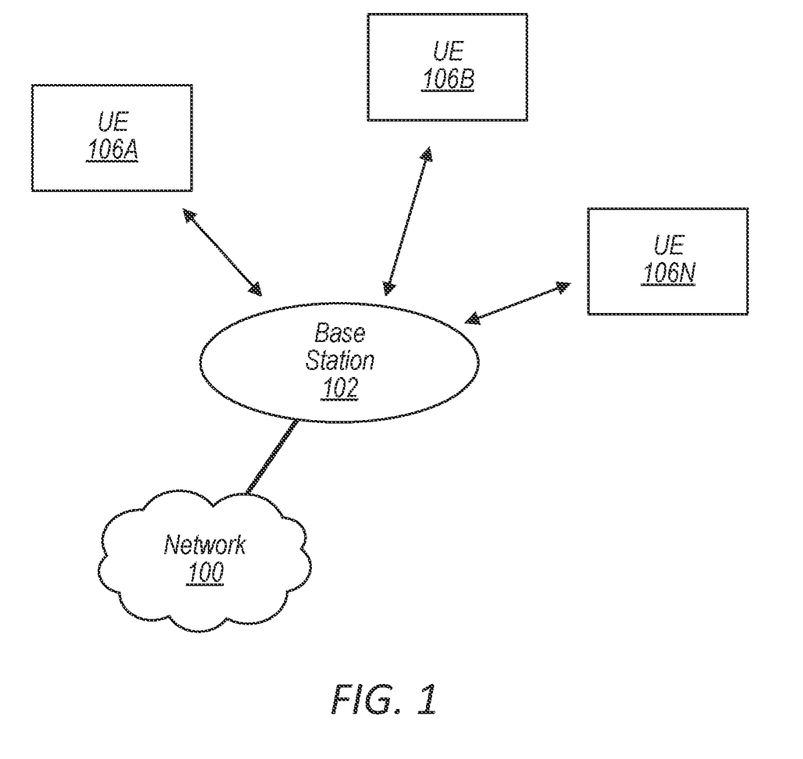
FIG. 1 illustrates an exemplary (and simplified) wireless communication system, according to some embodiments.
Figure 2:
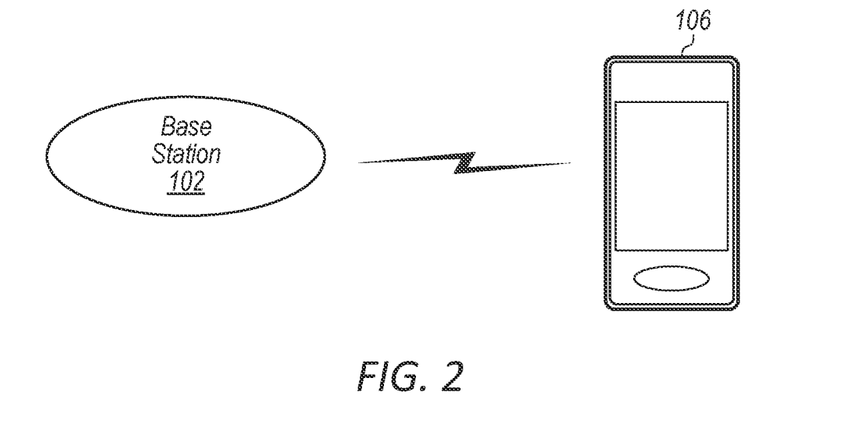
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform custom signaling according to a framework for performing custom signaling between a wireless device and a cellular network, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
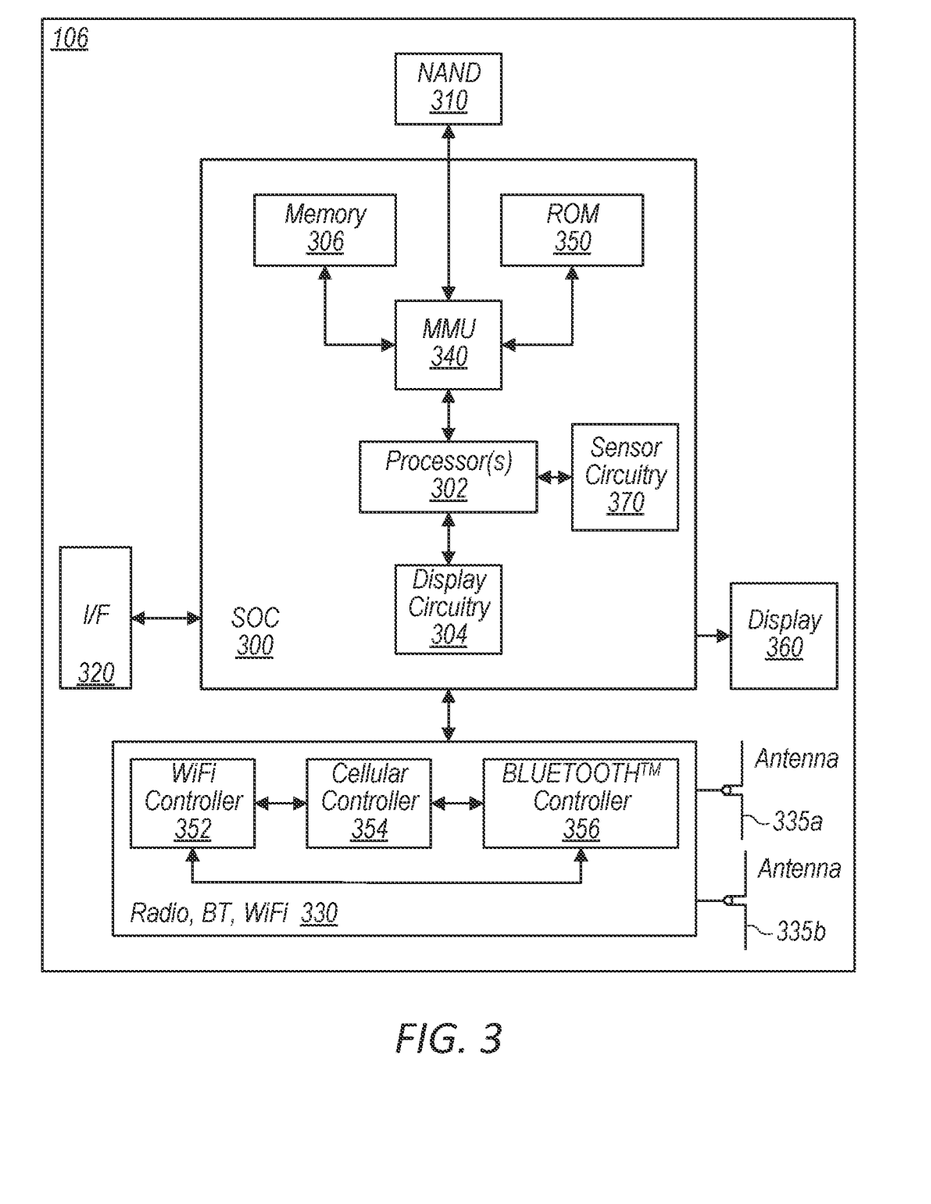
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform techniques for performing custom signaling according to a framework for performing custom signaling between a wireless device and a cellular network, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform custom signaling according to a framework for performing custom signaling between a wireless device and a cellular network according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
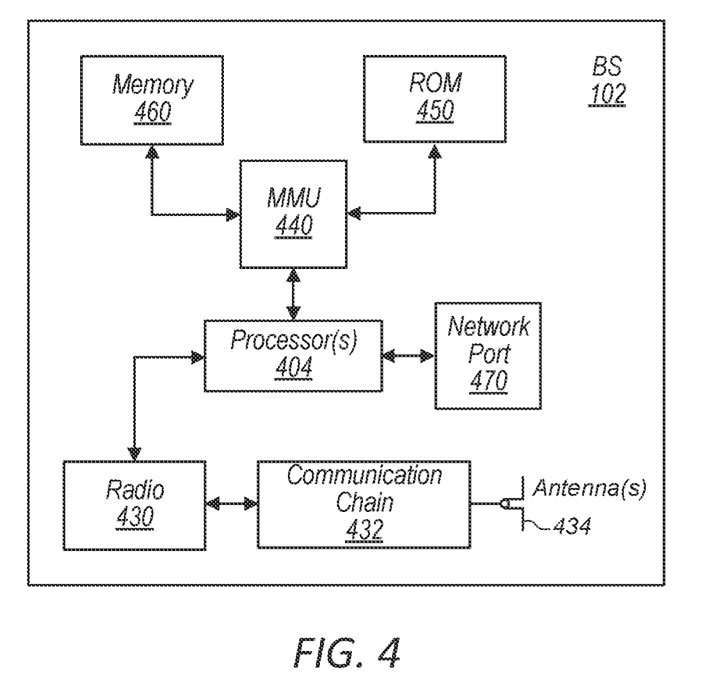
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Figure 5:
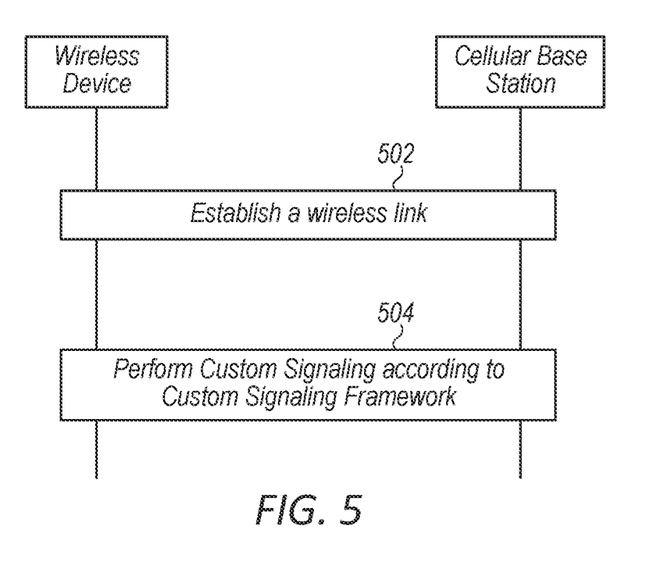
FIG. 5 is a signal flow diagram illustrating aspects of an exemplary possible method for supporting custom signaling between a wireless device and a cellular network, according to some embodiments.

FIG. 5— Framework for Custom Signaling Between a Wireless Device and a Cellular Network FIG. 5 is a flowchart diagram illustrating a method for performing custom signaling according to a framework for performing custom signaling between a wireless device and a cellular network, at least according to some embodiments.

Aspects of the method of FIG. 5 may be implemented by a wireless device and/or a cellular base station, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device may establish a wireless link with the cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least in some instances, establishing the wireless link(s) may include the wireless device providing capability information for the wireless device. Such capability information may include information relating to any of a variety of types of wireless device capabilities. Such information could include information indicative of a wireless device type of the wireless device and/or a 3GPP release version of the wireless device, information indicating whether the wireless device supports one or more custom signaling features, and/or any of various other possible types of capability information, according to various embodiments.

In 504, the wireless device and the cellular network may perform custom signaling according to a custom signaling framework. The custom signaling may include signaling provided from the wireless device to the cellular network and/or signaling provided from the cellular network to the wireless device. The custom signaling may be provided using one or more of RRC or non-access stratum (NAS) messages, at least according to some embodiments.

The custom signaling may include signaling that is custom to any or all of the cellular network, the wireless device type, the 3GPP release version of either or both of the wireless device and the cellular base station, and/or to any of various other possible parameters or sets of parameters. For example, in some instances, the custom signaling may include signaling support for a feature that is agreed to be supported between a cellular network operator and wireless devices of a specific type (e.g., those sold by a specific wireless device vendor, those of a specific wireless device model, etc.) and/or of at least a certain 3GPP release version when agreed upon signaling is used in accordance with the custom signaling framework. As another possibility, the custom signaling could include signaling to enable or disable a custom feature, or to provide information (e.g., one or more measurement or parameter values) in conjunction with a custom feature. Numerous other use cases are also possible.

The custom signaling framework may provide support for one or more custom signaling mechanisms. As one such possible mechanism, specified values and/or fields of abstract syntax notation (ASN1) messages may be configured for use for custom signaling between a wireless device and a cellular network. Thus, according to some embodiments, it may be possible that the wireless device transmits custom signaling to the cellular base station using one or more values and fields of ASN1 messages that are configured for use for custom signaling, and/or that the cellular base station transmits custom signaling to the wireless device using one or more values and fields of ASN1 messages that are configured for use for custom signaling.

As another possible mechanism, spare bits and/or fields of one or more of radio resource control (RRC) or non-access stratum (NAS) messages may be configured for use for custom signaling between a wireless device and a cellular network. Thus, according to some embodiments, it may be possible that the wireless device transmits custom signaling to the cellular base station using one or more spare bits and/or fields of one or more RRC or NAS messages that are configured for use for custom signaling, and/or that the cellular base station transmits custom signaling to the wireless device using one or more spare bits and/or fields of one or more RRC or NAS messages that are configured for use for custom signaling.

Note that in such a scenario, the use of spare bits and/or fields of RRC and/or NAS messages for custom signaling may be supported further based at least in part on a 3GPP release version of the wireless device, at least according to some embodiments. For example, it may be possible that one or more bits and/or fields of RRC and/or NAS messages that are specified as spare for some (e.g., earlier) 3GPP release versions are not specified as spare for other (e.g., later) 3GPP release versions. In such a scenario, whether those fields are determined to be used for custom signaling according to the custom signaling framework or for a 3GPP specified purpose may depend on the 3GPP release version of the device transmitting the signaling, at least according to some embodiments.

As a still further possible mechanism, it may be the case that a custom signature can be appended to one or more of a RRC message or a NAS message between a wireless device and a cellular network to perform the custom signaling. Thus, according to some embodiments, it may be possible that the wireless device transmits custom signaling to the cellular base station by appending a custom signature that is configured for use for custom signaling to one or more RRC or NAS messages, and/or that the cellular base station transmits custom signaling to the wireless device by appending a custom signature that is configured for use for custom signaling to one or more RRC or NAS messages.

When the wireless device or the cellular base station supports the custom signaling framework and receives the custom signaling from the other, it may be able to determine that the custom signaling is custom signaling based at least in part on the custom signaling being received in accordance with the custom signaling framework. Thus, for example, the wireless device or the cellular base station may determine that signaling received is custom signaling in accordance with the custom signaling framework based at least in part on the signaling including one or more values and/or fields of ASN1 messages configured for use for custom signaling, using one or more spare RRC and/or NAS bits and/or fields configured for use for custom signaling, and/or including one or more custom signatures configured for use for custom signaling appended to one or more RRC and/or NAS messages, among various possibilities. The device receiving the custom signaling may then further attempt to determine (e.g., by parsing or decoding the custom signaling) what is being indicated by the custom signaling, e.g., in accordance with any custom signaling agreement or agreements that have been established for use between the devices.

Note that at least in some instances, it may be the case that if one or the other of the wireless device or the cellular network does not support the specific custom signaling used by the other party, that party may be able to ignore the custom signaling and perform their protocol procedures as otherwise specified.

Thus, at least according to some embodiments, the method of FIG. 5 may be used to provide a framework for supporting custom signaling between a wireless device and a cellular network. Such a framework may help facilitate easier introductions of new custom features, e.g., as the availability of an existing framework for custom signaling may reduce barriers for introducing those new custom features, at least in some instances.

Additional Information

The following information includes further aspects that might be used in conjunction with the method of FIG. 5 if desired. It should be noted, however, that these exemplary details are not intended to be limiting to the disclosure as a whole: numerous variations and alternatives to the details provided herein below are possible and should be considered within the scope of the disclosure.

3GPP ASN1 doesn't currently provide the flexibility of customized RRC/NAS signaling between a UE and NW. Accordingly, it may be the case that in order for a UE and NW to perform a handshake procedure for a specific (e.g., custom) feature, a 3GPP specification change may be made. Obtaining 3GPP specification changes and (e.g., subsequently) implementing the relevant software changes on the UE and NW side may take a relatively long time, which may (at least in some instances) lead to longer times to launch specific/custom features.

Accordingly, it may be useful to provide a generalized principle for creating custom signaling to facilitate handshaking between a UE and a NW without the need for a 3GPP specification change. Such a framework may be useful for RRC signaling and/or any other messages being provided from the UE to the network, and vice versa.

Custom signaling according to such a framework may be useful, as one example, in case a UE supports a (e.g., custom) feature and if the feature needs some sort of assistance from or has some sort of impact on the network such that the custom signaling may be useful to share the intent from the UE to the network, and vice versa.

As one general approach, custom signaling messages can be created and a set of rules can be associated to these custom signaling messages, which may be known to the specific UE and NW implementation. The UEs and NWs that don't understand this custom signaling may be able to ignore these messages and continue their regular protocol procedures. The custom signaling and rules may be defined in such a way that it is forward compatible, and also that it doesn't break any existing protocol procedures.

As one possible example use case, consider a feature in which a UE can trigger a secondary cell group (SCG) failure procedure for internal reasons (e.g., thermal constraints, power saving considerations, etc.), e.g., that may be unrelated to the actual performance of the secondary cell group. In such a scenario, the UE may be able to indicate this to the network via custom signaling, e.g., so that the network can perform the SCG failure procedure but can choose to not count the SCG failure towards their key performance indicator (KPI) processing.

As a first example of how such custom signaling could be supported, specific values and fields in ASN1 messages, e.g., such that they are still within ASN1 range but will not be used in practical or commercial deployments, can be used for custom signaling. For example, considering again the preceding example use case, the following ASN1 message could be provided by a UE to indicate to a NW to initiate SCG failure but to not count this SCG failure towards their KPIs.

```
value UL-DCCH-Message ::=
{
  message messageClassExtension : c2 : scgFailureInformationNR-r15 :
  {
    criticalExtensions c1 : scgFailureInformationNR-r15 :
    {
      failureReportSCG-NR-r15
      {
        failureType-r15 t310-Expiry
        measResultFreqListNR-r15
        {
          ARFCN-ValueNR-r15 0
          MeasResultCellNR-r15
          {
            pci-r15 0,
```

-continued

```
            measResultCell-r15
            {
            }
          }
        }
      }
    }
  }
}
```

In this example, ARFCN is set as 0 (which is currently not valid in commercial deployment) along with PCI being 0 and measResults being empty, which together can be defined as a unique signature indicating to initiate SCG failure but to not count these SCG failures towards their KPIs.

Note that while in this example the measurement results are empty, in some instances, it may be the case that a UE also has measurement results to report. In such a scenario, it may be the case that the first entry of measResultFreqListNR-r15 may include the custom signature, and any further entries may be used to provide those (e.g., actual) measurement results, as one possibility. Other configurations are also possible.

As a second example of how such custom signaling could be supported, spare bits and/or fields in RRC and/or NAS messages could be used for custom signaling. UEs that support such custom messages can include the spare bits in RRC and NAS signaling messages. Note that it may be the case that NWs that support such custom messages may consider these spare bits as custom signaling information elements (IEs) only if the UE's release version belongs to a particular category/type associated with use of those spare bits as custom signaling IEs. For example, in R15 3GPP may define Spare 1 as one of the fields in FailureType. In R16 Spare 1 can be changed to t312-Expiry. Hence, to maintain forward compatibility, it may be the case that the NW considers the value of FailureType=8 as Spare 1 for a R15 UE and consider it as custom signaling, whereas it should consider FailureType=8 as t312-expiry for a R16 UE. As an example, the following message could be used to provide custom signaling (e.g., again for the preceding example use case) in such a manner:

```
FailureReportSCG ::= SEQUENCE {
  failureType ENUMERATED {
    t310-Expiry, randomAccessProblem,
    rlc-MaxNumRetx,
    synchReconfigFailureSCG, scg-ReconfigFailure,
    srb3-IntegrityFailure, spare2, spare1},
  measResultFreqList MeasResultFreqList OPTIONAL,
  measResultSCG-Failure OCTETSTRING (CONTAINING
    MeasResultSCG-Failure)
  OPTIONAL,
  ...
}
```

As a third example of how such custom signaling could be supported, it may be possible to append a custom signature after an RRC/NAS message. For example, consider an example in which the encoded ASN1 message of RRC Security Mode complete is 0x01 0x0A 0x0E. To perform custom signaling, a UE may be able to append a special signature (e.g., 0xDE 0xAD 0xBE 0xEF, as an arbitrary example) after the RRC Security mode ASN1 encoded message. At the NW side, the ASN1 decoder would decode and understand the message through the 0x01 0x0A 0x0E byte stream, and would ignore the appended signature 0xDE 0xAD 0xBE 0xEF. If the NW does support such a mechanism of custom signaling, the NW may be configured to (e.g, may include software configured to) note the point at which the ASN1 decoder skipped the remaining byte stream and determine it to be a custom signature from the UE, and may treat the UE in accordance with the custom signaling.

In the following further exemplary embodiments are provided.

One set of embodiments may include a method, comprising: by a wireless device: performing custom signaling with a cellular network according to a custom signaling framework Another set of embodiments may include a method, comprising: by a cellular network element: performing custom signaling with a wireless device according to a custom signaling framework.

According to some embodiments, according to the custom signaling framework, specified values and fields of abstract syntax notation (ASN1) messages are configured for use for custom signaling between a wireless device and a cellular network.

According to some embodiments, according to the custom signaling framework, spare bits and/or fields of one or more of radio resource control (RRC) or non-access stratum (NAS) messages are configured for use for custom signaling between a wireless device and a cellular network.

According to some embodiments, according to the custom signaling framework, use of spare bits and/or fields of one or more of RRC or NAS messages for custom signaling is supported further based at least in part on a third generation partnership program (3GPP) release version of the wireless device.

According to some embodiments, according to the custom signaling framework, a custom signature can be appended to one or more of a radio resource control (RRC) message or a non-access stratum (NAS) message between a wireless device and a cellular network.

A further exemplary embodiment may include a method, comprising: performing, by a device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
a processor configured to:
 determine to trigger secondary cell group (SCG) failure; and
 in response to the determination to trigger SCG failure, instruct a radio operably coupled to the processor to transmit, to a cellular network, signaling including:
  a physical cell identity (PCI) field with a value of 0; and
  a measurement results field, the measurement results field being empty.

2. The apparatus of claim 1, wherein the signaling further includes an absolute radio frequency channel number (ARFCN) field with a value of 0.

3. The apparatus of claim 1, further comprising the radio operably coupled to the processor, the radio configured to transmit the signaling.

4. The apparatus of claim 1, wherein the signaling indicates to initiate SCG failure without counting the SCG failure towards key performance indicators (KPIs) for a base station.

5. The apparatus of claim 1, wherein the signaling comprises a first entry of a measResultFreqListNR-r15 information element (IE).

6. An apparatus, comprising:
 a processor configured to cause a user equipment (UE) to:
  establish a wireless link with a cellular network;
  determine to initiate secondary cell group (SCG) failure; and
  transmit, to the cellular network, custom signaling, the custom signaling including a unique signature indicating to initiate the SCG failure.

7. The apparatus of claim 6, wherein the custom signaling is identifiable as being associated with a custom signaling framework based on inclusion of one or more specified values or fields of abstract syntax notation (ASN1) messages.

8. The apparatus of claim 7, wherein the one or more specified values or fields of ASN1 messages include a physical cell identity (PCI) field with a value of 0.

9. The apparatus of claim 7, wherein the one or more specified values or fields of ASN1 messages include a measurement results field being empty.

10. The apparatus of claim 7, wherein the one or more specified values or fields of ASN1 messages include an absolute radio frequency channel number (ARFCN) field with a value of 0.

11. The apparatus of claim 6, wherein the custom signaling indicates to initiate SCG failure without counting the SCG failure towards key performance indicators (KPIs) for a base station.

12. The apparatus of claim 6, wherein the determination to trigger SCG failure is based on a thermal constraint.

13. The apparatus of claim 6, wherein the determination to trigger SCG failure is based on power saving.

14. The apparatus of claim 6, further comprising a radio operably coupled to the processor.

15. A method, comprising:
 at a cellular network:
  establishing a wireless link with a user equipment (UE); and
  receiving, from the UE, a message according to a first custom signaling framework, the message including:
   a physical cell identity (PCI) field with a value of 0; and
   a measurement results field, the measurement results field being empty.

16. The method of claim 15, wherein the message is identifiable as being associated with the first custom signaling framework based on inclusion of one or more specified values or fields of abstract syntax notation (ASN1) messages.

17. The method of claim 16, wherein the one or more specified values or fields of ASN1 messages include the measurement results field being empty.

18. The method of claim 16, wherein the one or more specified values or fields of ASN1 messages include the PCI field with the value of 0.

19. The method of claim 15, wherein the message comprises a first entry of a measResultFreqListNR-r15 information element (IE).

20. The method of claim 15, wherein the message indicates to initiate secondary cell group (SCG) failure without counting the SCG failure towards key performance indicators (KPIs) for a base station.

* * * * *